4 Sheets—Sheet 1.

J. BAIRD.
Steam-Engine.

No. 203,989. Patented May 21, 1878.

Witnesses
Daniel E. Scannell
C. L. Beretta

Inventor
John Baird

4 Sheets—Sheet 2.
J. BAIRD.
Steam-Engine.
No. 203,989. Patented May 21, 1878.
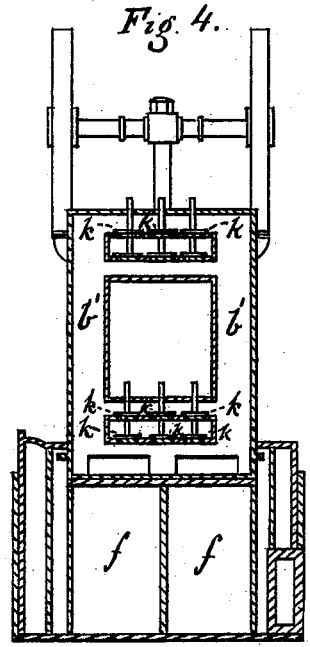
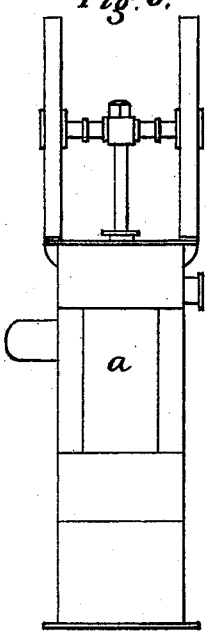
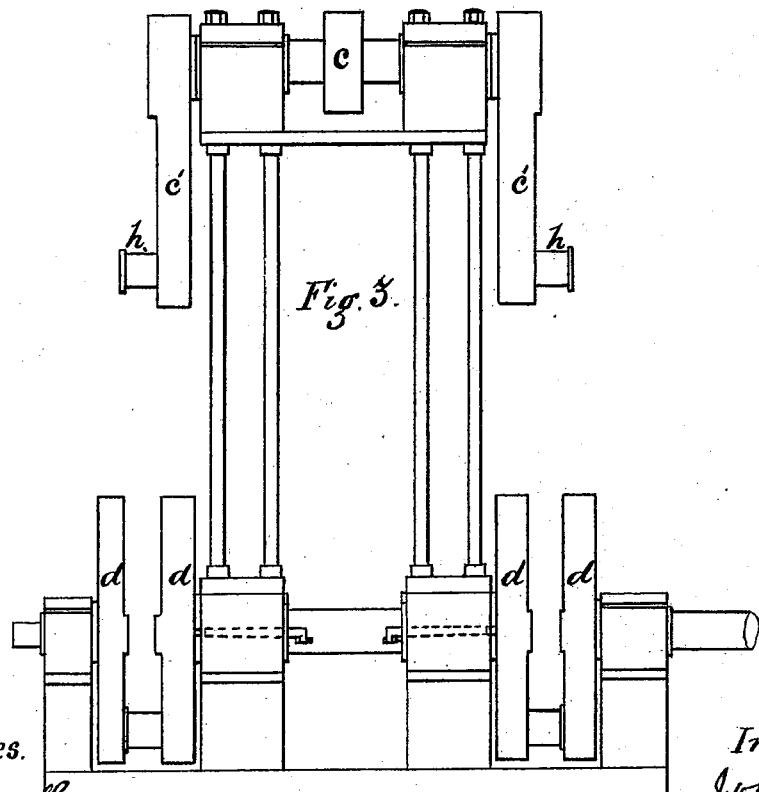
Witnesses. Inventor.

4 Sheets—Sheet 3.

J. BAIRD.
Steam-Engine.

No. 203,989. Patented May 21, 1878.

Witnesses: Daniel B. Scannell

Inventor: John Baird

4 Sheets—Sheet 4.
J. BAIRD.
Steam-Engine.
No. 203,989. Patented May 21, 1878.
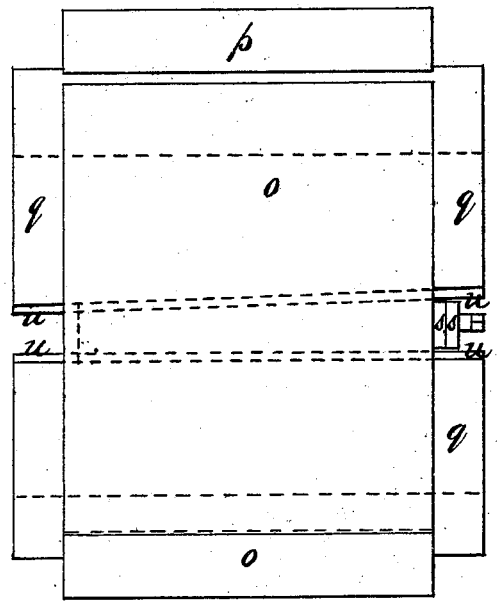
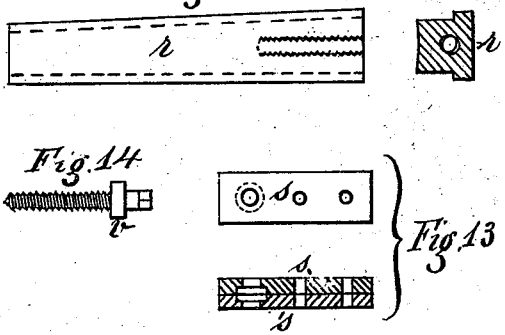
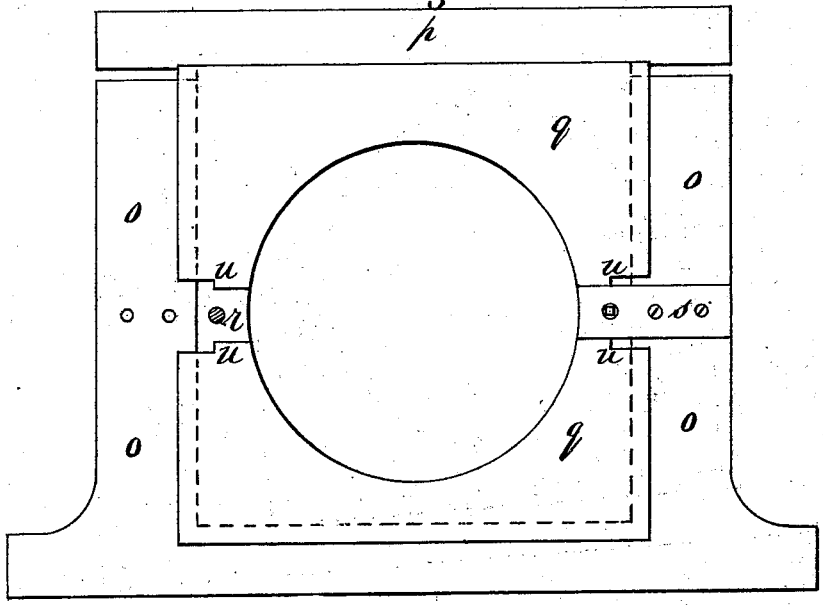
Witnesses.
Daniel E. Scannell
Inventor.
John Baird

UNITED STATES PATENT OFFICE.

JOHN BAIRD, OF NEW YORK, N. Y.

IMPROVEMENT IN STEAM-ENGINES.

Specification forming part of Letters Patent No. 203,989, dated May 21, 1878; application filed August 6, 1877.

*To all whom it may concern:*

Be it known that I, JOHN BAIRD, of the city, county, and State of New York, have invented certain new and useful Improvements in Steam-Engines; and that the following, taken in connection with the drawings, is a full, clear, and exact description thereof.

Figure 2:
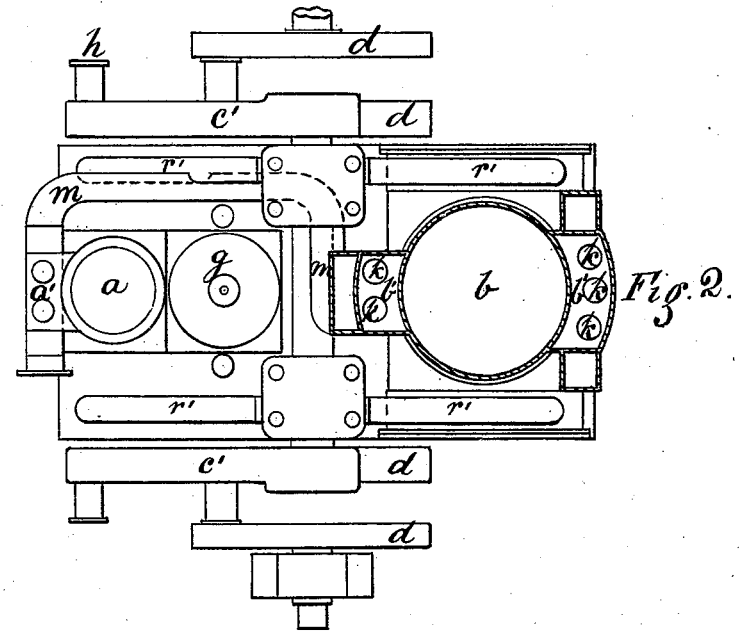
Figure 1:
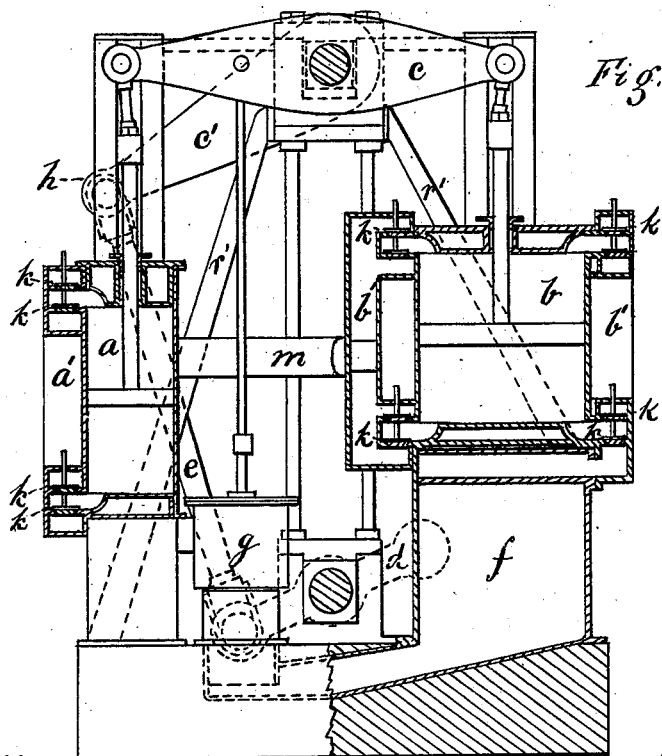
Figure 6:
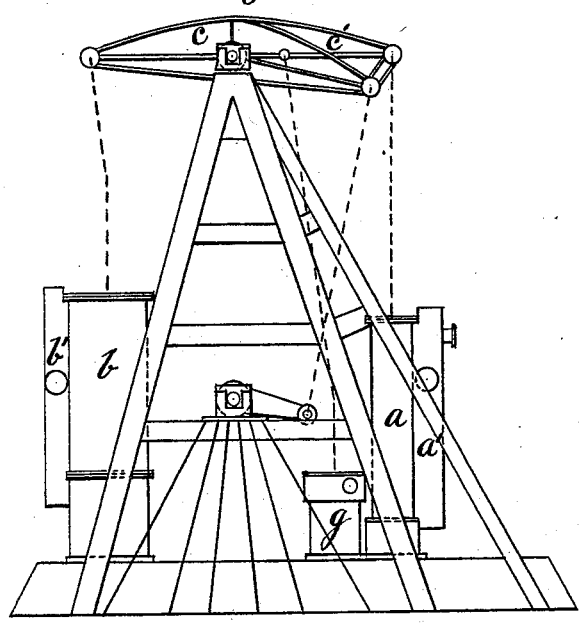
Figure 7:
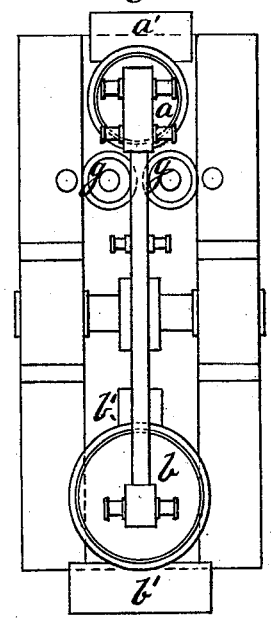
Figure 8:
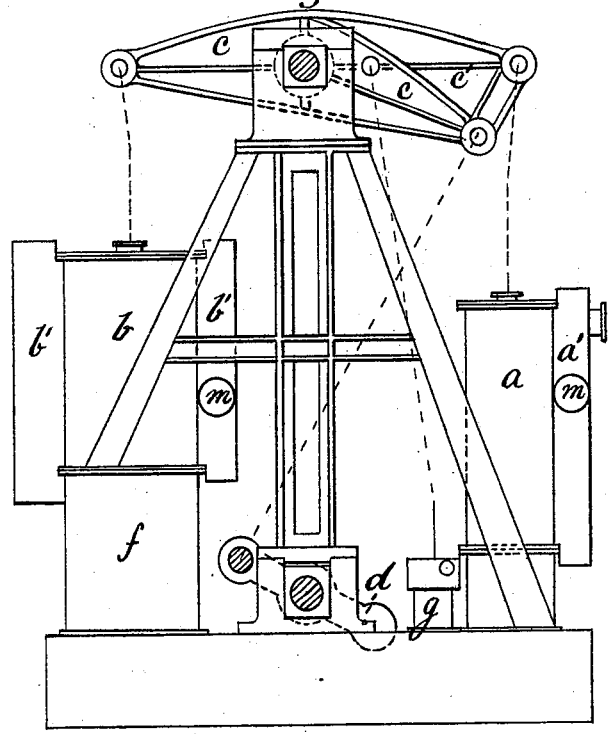
Figure 9:
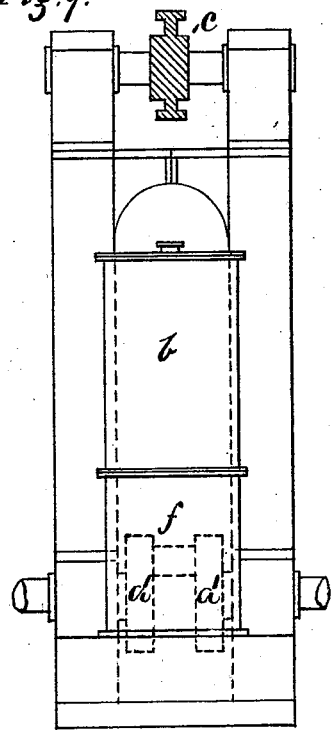

In the drawings, Figure 1 is a vertical longitudinal sketch of an engine, partly in section, partly in elevation. Fig. 2 is a plan of parts of the same, partly in section. Fig. 3 is a transverse elevation of parts of the same engine. Fig. 4 is a vertical section through the exhaust-valves and valve-chests of the low-pressure cylinder of the same engine. Fig. 5 is an end elevation of the high-pressure cylinder of the same engine. Fig. 6 is a vertical longitudinal sketch of a modification of the engine mounted upon a wooden frame. Fig. 7 is a plan of parts of Fig. 8. Fig. 8 is a vertical longitudinal elevation of a modification mounted upon an iron frame. Fig. 9 is a partial end elevation of Fig. 8.

All the other figures, which are on a larger scale, are details of my improvement in brasses for pillow-blocks.

My improvements, except those relating to pillow-blocks and valves, are in new arrangements and combinations of the parts of the Wolf engine, invented about 1806, and now under various forms in common use, and usually termed "compound engines." These engines have both a high and a low pressure cylinder, the latter supplied with steam through the former.

Before commencing the description of my improvements, I desire it to be understood that I know that engines existed prior to my invention provided with two cylinders and their accessories, a lever-beam, a crank, and connecting-rod, in which the low-pressure cylinder stood under one end of the beam, and was connected thereto, while the high-pressure cylinder was located so that its links took hold of the beam between the beam center-pin and the beam-pin of the connecting-rod, which latter was applied at the end of the beam farthest from the low-pressure cylinder, and took hold of a crank located under this same end of the beam, outside of the high-pressure cylinder; or, in other words, this old engine was an ordinary low-pressure beam-engine having added thereto a high-pressure cylinder located between the crank and the condenser, and connected to the beam between the connecting-rod pin and the beam center-pin. In this engine the stroke of the high-pressure cylinder was of necessity only about half that of the low-pressure cylinder, and room was wasted because the crank at points in its throw projected out beyond the end of the beam. In my improved engine some room is saved, the pistons may have the same length of stroke, and they and their rods and links move with equal velocities; hence the engine is better balanced.

These are advantages; but the great end attained by my invention is that, owing to it, a compound beam-engine can be used to advantage in a propeller-ship. In such ships the shaft usually lies in the center of the vessel, and if the crank be outside of either the high or the low pressure cylinder, both cylinders and the whole length of the beam must be located on one side of the shaft. Hence such an engine could with difficulty, if at all, be got into a ship, and then only with a very short beam, and consequently short stroke, and when in place its weight would all be on one side of the vessel.

By my improvement, in which the crank lies under the beam-center, between lines passing through the centers of the two cylinders, the engine straddles the propeller-shaft, with one cylinder on each side of the shaft, has only one-half of its beam on each side of the shaft, can be got into any ship, can have a long beam, if desired, and when in the ship has its center of gravity nearly over the keel of the vessel.

My engine is therefore peculiarly adapted for use in propellers, but may, with advantage, be employed wherever beam-engines of any kind are now used.

In all the drawings, the high-pressure cylinder is shown at $a$ and its valve-chests at $a'$. The low-pressure cylinder is shown at $b$; its valve chest or chests at $b'$; the beam, having a fixed bearing for its center-pin, as usual, at $c$; the crank or cranks at $d$; the connecting rod or rods at $e$, and the condenser at $f$, and the air pump or pumps at $g$; and it will appear from inspection of the drawings that the high-pressure cylinder is connected at one end of the beam, or nearly so, and the low-pressure cylinder at the other, while in all cases the axis passing through the crank-shaft lies underneath the beam center-pin, or nearly so, so that the engine lies on each side of the shaft or straddles it. This peculiar arrangement of the parts necessitates a beam in which the center-pins for the connecting-rod are out of the straight line passing through the beam center-pin and the pins for the links of the cylinder. In Figs. 1, 2, and 3 this arrangement of the pins is secured by the use of two rocking arms or supplementary beams, $c'$ $c'$, which are keyed upon the main beam-center, and carry the connecting-rod pins $h$ $h$, this plan involving the use of two connecting-rods and a center-shaft, each end of which carries a crank.

In the modification shown in Figs. 6 and 8 the same end is attained by so forming the beam that the pin for the connecting-rod may be secured thereto below the straight line which passes both through the center-pins for the beam and through those for the cylinder-links.

In the modification of Figs. 1, 2, and 3, the connecting-rods and cranks are outside of the frame, and therefore do not conflict in working with any other parts of the engine.

In the modification of Figs. 6, 7, 8, and 9, two small air-pumps, $g$ $g$, are used instead of a single large pump, and these pumps are located close to one of the cylinders, and the connecting-rod plays between the links, which move the cross-heads of the pumps.

The same end—viz., the movement of the connecting-rod without interfering with other parts of the engine—might be attained by using a single pump with a yoke in its link, through which the connecting-rod could pass, or by the use of an independent air-pump, or one moved by an eccentric or crank on the main shaft, and in other ways.

These engines may be furnished with any known kinds of condensers, air-pumps, valves, valve-chests, and valve-gear. Moreover, the engines may be mounted upon any appropriate framing, either of wood or metal.

I prefer to use puppet-valves, as I know that they work well in engines running up to sixty or seventy revolutions, and as they are more easily handled by the engineer in stopping, starting, and backing than any other valves; and, when using puppet-valves, I prefer to use two or more balanced puppet-valves, all steam or all exhaust, in a single valve-chest to perform the duty now performed by a single valve. Such valves are shown applied to the low-pressure cylinder at $k$ $k$ $k$ in Figs. 2 and 4.

The sets of both steam and exhaust valves may be located in one chest for the top and another for the bottom of the cylinder, the steam and exhaust having nozzles common to both, as usual; but I prefer to have separate chests for the steam-valves and separate chests for the exhaust-valves, with separate nozzles, and located on opposite sides of the cylinder, as shown in Figs. 1, 2, and 4. In these figures the pipe which conveys exhaust-steam from the high-pressure cylinder to the induction-valve chest of the low-pressure cylinder is shown at $m$, and two pairs of balanced puppet induction-valves for each end of the low-pressure cylinder, and three pairs of balanced puppet eduction or exhaust valves for each end of the same cylinder.

It is a fact well known to engineers that puppet-valves must be lifted to a certain height in order to secure a passage equal to the area of the aperture in the seat, and that a large valve must be lifted higher than a smaller one. For instance, in round numbers, a twelve-inch valve must be lifted about three inches, while a four-inch valve need be lifted only a little more than one inch. Three seven-and-a-half-inch valves have more area than one twelve-inch valve, and in order to give free passage to the steam need be lifted only two inches, while the area of the valve-chest between the valves when seated and the bore of the cylinder is less for the three seven-and-a-half-inch than the one twelve-inch valve. Hence it follows that there is less loss of steam with the three seven-and-a-half-inch than the one twelve-inch valve.

It ought further to be stated that, with the puppet-valve engines now in use in propellers running, say, to sixty revolutions, the steam-valves must rise and fall (when the engine is running at its usual period of cut-off) during a time which is only one-fifth or one-sixth of a stroke, or one-tenth or one-twelfth of a revolution; hence the great necessity for an induction-valve, or valves with comparatively small rise and fall.

I have found by experience that two inches is about the limit to which double-beat or balanced puppet-valves can be raised in such engines, cutting off at less than three-eighths of the stroke. Further, in such engines, where the steam is highly expanded, there must be very large exhaust-openings, in order to avoid back-pressure, and three and a half inches is about the safe limit of lift for exhaust-valves of such fast-running engines.

An additional advantage of the use of multiple balanced valves as contrasted with a single valve performing the same duty is that the chests may be made circular, as represented in the drawings, so that room is saved, owing to the small projection of the chest from the cylinder, and, in addition to this, it is a well-known fact that the small valves are more easily kept tight than large ones. Great advantages, therefore, follow from my combination of several balanced puppet-valves all steam or all exhaust with a single valve-chest or chest common to all the valves.

My last improvement relates to pillow-blocks, and this improvement, although specially useful in engine pillow-blocks, may be applied to pillow-blocks generally.

This improvement is represented at Figs. 10 to 14, inclusive. Fig. 10 is a side elevation of the pillow-block and brasses; Fig. 11, an end elevation of the same. Fig. 12 is an elevation and section of one of the keys; Fig. 13, an elevation of and cross-section through one of the adjusting-screw supporters; and Fig. 14 is a plan of one of the screws. In these figures the block itself is shown at $o\ o$, and the cap at $p$, both of any ordinary construction. The brasses are shown at $q$. These may be of any metal or Babbit-metalled, and of any ordinary construction, save at the surfaces $u\ u$, which surfaces are inclined to the top of one brass and the bottom of the other, (see Fig. 10,) and are also rabbeted, so as to receive the keys, Fig. 12. (See left-hand of Fig. 11, where the key $r$ is represented in place.) These rabbets may be of any form, or the surfaces may be simply inclined across the block, so as to receive a wedge-key, the face of which nearest the shaft is narrower than the face farthest from the shaft, the object being to keep the keys firm in place, and in some cases I intend to dispense with the rabbets or their equivalents.

The keys are so clearly represented as to need no further description, except to say that they are bored out and have a screw-nut formed in the bore, as shown in Fig. 12. Upon the ends of the pillow-blocks are secured two screw-supporters, $s\ s$, one of which is represented in place in Fig. 11. These supporters I prefer to make of two pieces of metal provided with holes, through which the screws that fasten them to the block pass, and each having a recess, which, when the pieces of metal are put together, form a single recess to receive the collar $v$ of the screw. When the brasses are in place, also the keys, the screws, and the screw-supporters, turning of the screws in one direction or the other will move the keys endwise and cause the brasses to recede from or approach to each other, so that in case of wear of either brasses or shaft the two may be properly adjusted to each other. Such adjustment is specially necessary in fast-running engines of great power, as the least play the shaft in the brasses causes a thump.

I have found that a brass very little over one-fiftieth of an inch in internal diameter greater than the external diameter of the shaft best avoids jars and works with least friction, and my plan is the only one known to me by which such proper relation of shaft and brasses can be secured. I have also found that ordinary brasses, as they get worn, tend to pinch the shaft at those points of the upper and lower brass which are nearest each other.

Experience has proved that my combination of keys with the brasses remedies the difficulty. These brasses are best adjusted by setting the cap down tight and then causing the keys to shove the brasses apart a little, slackening the binder-screws, if necessary, and as the brasses become worn a liner may be introduced under the lower brass.

I claim as my invention—

1. The combination, hereinbefore described, of two cylinders, a beam with a fixed bearing for its center-pin, a crank-shaft, and connecting-rod, when these parts are arranged substantially as described—that is to say, with the axis of the shaft substantially under the beam center-pin and between lines passing through the center lines of the two cylinders, as hereinbefore set forth.

2. In combination with a single valve-chest, a set of balanced or double-beat puppet-valves, all performing the same duty, located in that chest, substantially in the manner and for the purpose specified.

3. In combination with the brasses of a pillow-block, keys applied between the brasses, constructed and capable of operating as specified, the combination being substantially as described.

JOHN BAIRD.

Witnesses:
 DANIEL E. SCANNELL,
 P. L. GERETTA.